US011373529B2

(12) United States Patent
Schuller et al.

(10) Patent No.: US 11,373,529 B2
(45) Date of Patent: Jun. 28, 2022

(54) METHOD FOR AUTHENTICATING A MOTOR VEHICLE (71) Applicant: AUDI AG, Ingolstadt (DE)

(72) Inventors: Florian Schuller, Ismaning (DE); Christian Feist, Ingolstadt (DE)

(73) Assignee: Audi AG, Ingolstadt (DE)

( * ) Notice: Subject to any disclaimer, the term of this patent is extended or adjusted under 35 U.S.C. 154(b) by 166 days.

(21) Appl. No.: 16/764,173

(22) PCT Filed: Aug. 22, 2018

(86) PCT No.: PCT/EP2018/072634
§ 371 (c)(1),
(2) Date: May 14, 2020

(87) PCT Pub. No.: WO2019/115023
PCT Pub. Date: Jun. 20, 2019

(65) Prior Publication Data
US 2020/0294399 A1 Sep. 17, 2020

(30) Foreign Application Priority Data
Dec. 12, 2017 (DE) ..................... 10 2017 222 434.7

(51) Int. Cl.
*G08G 1/14* (2006.01)
*B60W 60/00* (2020.01)
(52) U.S. Cl.
CPC ......... *G08G 1/146* (2013.01); *B60W 60/0025* (2020.02); *G08G 1/149* (2013.01); *G08G 1/143* (2013.01)
(58) Field of Classification Search
CPC ........ G08G 1/146; G08G 1/149; G08G 1/143; B60W 60/0025
See application file for complete search history.

(56) References Cited

U.S. PATENT DOCUMENTS 9,587,948 B2 3/2017 Schuller et al.
11,027,651 B2 * 6/2021 Yamanaka ........... G05D 1/0246
(Continued)

FOREIGN PATENT DOCUMENTS

CN 105491084 A 4/2016
CN 106330445 A 1/2017
(Continued)

OTHER PUBLICATIONS

International Preliminary Report on Patentability and Written Opinion of the International Searching Authority directed to related International Patent Application No. PCT/EP2018/072634, completed Mar. 13, 2020, with attached English-language translation; 12 pages.

(Continued)

*Primary Examiner* — Dale W Hilgendorf
(74) *Attorney, Agent, or Firm* — Sterne, Kessler, Goldstein & Fox P.L.L.C.

(57) ABSTRACT

The disclosure relates to a method for authenticating a motor vehicle to perform at least one procedure relating to a predetermined region able to be traveled through by the motor vehicle. When the motor vehicle approaches, the predetermined region is captured by a capturing device of the motor vehicle, and is identified accordingly. An identification message of the captured predetermined region is then output by the motor vehicle to a server device. Next, a request message for authenticating the motor vehicle is output in response to the identification message by the server device to a further server device associated with the predetermined region, and an authentication criterion is checked by the further server device.

12 Claims, 1 Drawing Sheet

(56) References Cited

U.S. PATENT DOCUMENTS

| | | | |
|---|---|---|---|
| 2006/0272556 A1 | 12/2006 | Apps | |
| 2008/0056495 A1* | 3/2008 | Eguchi | G07B 15/063 |
| | | | 705/50 |
| 2008/0310850 A1* | 12/2008 | Pederson | G08B 31/00 |
| | | | 398/135 |
| 2012/0143401 A1* | 6/2012 | Jayadevappa | E05B 47/0012 |
| | | | 701/2 |
| 2015/0137943 A1 | 5/2015 | Nagel et al. | |
| 2015/0179070 A1* | 6/2015 | Sandbrook | G07B 15/02 |
| | | | 340/932.2 |
| 2015/0343993 A1 | 12/2015 | Ferrieres et al. | |
| 2015/0347121 A1* | 12/2015 | Harumoto | G06F 8/65 |
| | | | 717/172 |
| 2016/0133134 A1* | 5/2016 | Todasco | G08G 1/146 |
| | | | 705/13 |
| 2017/0313307 A1 | 11/2017 | Nordbruch | |
| 2018/0089631 A1* | 3/2018 | Baker, Sr. | H04L 67/42 |
| 2019/0118802 A1* | 4/2019 | Sakuma | G08G 1/146 |
| 2020/0234582 A1* | 7/2020 | Mintz | G08G 1/0145 |
| 2021/0110714 A1* | 4/2021 | Maruiwa | B62D 15/0285 |

FOREIGN PATENT DOCUMENTS

| | | |
|---|---|---|
| DE | 102014001836 A1 | 8/2014 |
| DE | 102014002150 B3 | 7/2015 |
| DE | 102014224073 A1 | 6/2016 |
| DE | 102016001264 A1 | 9/2016 |
| DE | 102015013318 A1 | 4/2017 |
| DE | 102016100730 A1 | 7/2017 |

OTHER PUBLICATIONS

International Search Report and Written Opinion of the International Searching Authority directed to related International Patent Application No. PCT/EP2018/072634, dated Dec. 3, 2018, with attached English-language translation; 15 pages.

* cited by examiner

METHOD FOR AUTHENTICATING A MOTOR VEHICLE

TECHNICAL FIELD

The present disclosure relates to a method for authenticating a motor vehicle in order to perform at least one procedure by way of the motor vehicle, the at least one procedure relating to a predetermined region able to be traveled through by the motor vehicle. In the method, the motor vehicle first approaches the predetermined region, such as a parking garage, in order to perform the at least one procedure within the predetermined region. In a further method step, the predetermined region is captured by a capturing device of the motor vehicle and thereby identified.

BACKGROUND

It is known in the general prior art for motor vehicles to move autonomously within a parking garage or in a parking lot, for example for a parking or retrieval from parking procedure, that is, a procedure which relates to the parking garage or the parking lot.

For example, DE 10 2014 224 073 A1 describes a server for operating a parking lot. The server includes a database in which a digital map of the parking lot is stored. Furthermore, the server has a processor which is designed to determine at least one target position for a vehicle in the parking lot and at least a section of the digital map which corresponds to a subregion of the parking lot which the vehicle autonomously drives through on its way to the target position. Finally, the server includes a communication interface that is designed to transmit the section of the digital map and the target position to the vehicle via a communication network.

DE 10 2016 001 264 A1 also discloses a method for autonomously driving a vehicle within a limited area. Here, an in-vehicle control unit used for autonomous driving is controlled by an external control device via a vehicle interface. In the method, the in-vehicle control device used for autonomous driving checks whether the vehicle is within a limited area predefined by an external control device designed as a local infrastructure unit. In addition, the in-vehicle control unit used for autonomous driving operation establishes a wireless connection to the local infrastructure unit for controlling the autonomous driving process after determination of a position of the vehicle within the predefined limited area via a remote control interface of the vehicle, the local infrastructure unit controlling the vehicle remotely.

Furthermore, DE 10 2016 100 730 A1 describes a method for supporting an autonomous travel of a motor vehicle in a parking lot. In the method, an infrastructure map describing the parking lot within a parking lot reference system is provided, a reference position on the parking lot being specified as a reference point for the parking lot reference system, and in the infrastructure map at least one driving trajectory for the autonomous travel of the motor vehicle being predefined based on the reference point. In a further method step, at least one communication element is provided at the reference position on the parking lot for communicating with a parking assistance system of the motor vehicle. Furthermore, a position of the motor vehicle relative to the communication element is captured by the at least one communication element and the captured position of the motor vehicle is defined as a reference point for a motor vehicle reference system. Finally, the at least one driving trajectory specified in the parking lot reference system is transformed into the motor vehicle reference system.

Such servers or methods have the disadvantage that they are particularly expensive and complex to operate. In addition to the complex structure and the complex operation of such systems, which autonomously control a motor vehicle in a parking garage, none of the systems shows a possibility of authenticating the motor vehicle in order to perform the at least one procedure of the motor vehicle.

It is therefore an object of the present disclosure to provide a method for authenticating a motor vehicle with which an authentication of the motor vehicle is possible in a particularly simple and reliable manner.

DETAILED DESCRIPTION

The object of the present disclosure is achieved by a method for authenticating a motor vehicle having the features described in various embodiments of the present disclosure.

In the method for authenticating a motor vehicle in order to perform at least one procedure by way of the motor vehicle, the motor vehicle approaches a predetermined region in order to perform the at least one procedure within the predetermined region. The at least one procedure relates to the predetermined region able to be traveled through by the motor vehicle. In other words, at least one procedure of the motor vehicle is performed by the motor vehicle within the predetermined region. "Authentication" means in particular an authorization procedure, that is, an authorization of the motor vehicle, or a registration procedure, that is, a registration of the motor vehicle. In other words, a check is performed to determine whether the motor vehicle is authorized to perform the at least one procedure. The predetermined region can be, for example, a parking garage or a parking lot. For example, the motor vehicle can approach a parking garage or drive towards the parking garage in which the at least one procedure is to be performed by the motor vehicle.

The at least one procedure is in particular a driving operation of the motor vehicle. When performing the at least one procedure, the motor vehicle is preferably operated in an autonomous or fully automated driving mode. With autonomous driving mode, it is preferably meant here that the motor vehicle moves independently, i.e. fully automatically. In the autonomous driving mode it may be factored in that there are no persons at all in the motor vehicle or that there is no active driver or only passengers in the motor vehicle. For example, the motor vehicle is configured to drive autonomously from a delivery point to a predetermined position in autonomous driving mode. For example, the motor vehicle can drive autonomously in a parking lot from the delivery point to a parking position, in particular parking there. Additionally or alternatively, the motor vehicle is configured to drive back from the predetermined position to the delivery point. The "delivery point" is preferably a position at which a driver of the motor vehicle has parked the motor vehicle or has gotten out of the motor vehicle. In autonomous driving, the driver of the motor vehicle does not have to worry about the further operation of the motor vehicle.

In a particularly preferred manner, the motor vehicle may be controlled to perform the at least one procedure by way of a control device which is associated with the predetermined region. In other words, the motor vehicle can be remotely controlled by the control device. The control device can be configured to coordinate processes within the predetermined region, including the at least one procedure of the motor vehicle.

In a further method step, a capturing device of the motor vehicle captures the predetermined region, whereby the predetermined region is identified. In other words, the capturing device can recognize the predetermined region when approaching the predetermined region. In other words, when the motor vehicle approaches, the capturing device detects the perceived surroundings. The predetermined region can be identified or recognized, in particular in reference to or on the basis of the predetermined region captured by the capturing device, by a control device, in particular of the motor vehicle.

In a subsequent method step, an identification message of the captured predetermined region is output by the motor vehicle to a server device. The motor vehicle can have a communication device for outputting the identification message. The identification message may be output via a connection to the further server device, in particular via a radio link, such as, for example, a mobile radio link, in particular General Packet Radio Service (GPRS) or Long Term Evolution (LTE). The server device is particularly preferably a server device of the motor vehicle manufacturer. The identification message may comprise, for example, data or information which identifies or describes the predetermined region.

In response to the identification message, the server device outputs or sends out a request message for authenticating the motor vehicle to a further server device associated with the predetermined region. For example, the further server device associated with the predetermined region may be a local server device of the predetermined region. For example, the request message may be output via a connection to the further server device, in particular via a radio link, such as a mobile radio link or a wireless local-area network (WLAN) connection.

Finally, the further server device checks at least one authentication criterion when the request message is received. When the at least one authentication criterion is met, the motor vehicle is authenticated to perform the at least one procedure.

The method for authenticating the motor vehicle authorizes the motor vehicle only subject to a specific authentication criterion. In the authentication method, the motor vehicle interacts with a server device as an intermediate link and the local server device. Authentication is only possible if the specific authentication criterion is met. The individual query levels prevent misuse when the at least one procedure of the motor vehicle is being performed. As a result, it is possible to design the method for authenticating the motor vehicle to be particularly reliable and secure.

In some embodiments, when the predetermined region is captured, at least one feature of the predetermined region is captured by the capturing device. For example, the capturing device may be configured to capture a feature of the predetermined region, in particular a local feature, such as a landmark of the predetermined region. "Landmark" means in particular a topographical object. Landmarks play a particularly important role in spatial orientation. For example, the capturing device of the motor vehicle can have a camera and/or a sensor, such as an ultrasonic sensor, for this purpose. In other words, the motor vehicle sensor system can detect local features of the predetermined region. This has the advantage that the predetermined region can be captured by the motor vehicle in a particularly simple and reliable manner.

Additionally or alternatively, a radio link to the further server device is captured when the predetermined region is captured. In other words a local radio channel, in particular a local radio link, in particular a local network, can be recognized or captured by the motor vehicle, in particular the capturing device of the motor vehicle. To perform the at least one procedure of the motor vehicle, in particular for an autonomous or automatic driving operation, the predetermined region can advantageously have a communication unit for a local connection, in particular a radio link, and/or an Internet connection.

For example, the motor vehicle which wants to perform automatic driving operations in the infrastructure—the predetermined region—detects a local radio link and its surroundings, which are perceived by onboard sensors—the capturing device—during its approach. As a result, the motor vehicle can identify its surroundings particularly easily and initiate further steps for the at least one procedure to be performed.

When the predetermined region is identified, a digital map of the predetermined region is advantageously associated with the predetermined region on the basis of the captured at least one feature and/or the detected radio link. In other words, a relationship between the detection of the at least one feature and/or the radio link can be established from a map which relates to the predetermined region, in particular an a priori map. In other words, by comparing the detected information, such as the name of the radio link and/or the identified landmarks, to the digital map on the vehicle side, the target infrastructure—the predetermined region—can be identified. The captured features and/or the radio link can be used to provide map information of the predetermined region in a particularly simple and reliable manner.

In some embodiments, as soon as the digital map is associated with the predetermined region, further detailed information for reloading detailed map material for the predetermined region is requested. For example, the server device can be configured to transmit to the motor vehicle further map material or further data relating to the predetermined region.

In some embodiments, the identification message comprises map data of the digital map and/or the at least one feature of the predetermined region. In other words, the motor vehicle can use the identification message, for example via a mobile radio interface, to transmit data on the target infrastructure to the server device. In other words, the motor vehicle can report the identification of the active infrastructure, that is, the predetermined region in which the at least one procedure is to be performed actively, to the server device. Additionally or alternatively, the identification message can include data of the captured radio link, such as the name of the radio link.

In an advantageous manner, a possibility criterion for performing the at least one procedure by way of the motor vehicle is checked by the server device before the request message is output. In other words, the further server device can check the motor vehicle or data of the motor vehicle on the basis of the identification message received.

In some embodiments, when the possibility criterion is checked, the server device checks whether the motor vehicle is suitable for performing the at least one procedure in the at least one predetermined region and/or has access authorization to the predetermined region. In other words, the server device can check suitability and/or permission for the requested procedure, for example the automated driving operation. "Suitability" means in particular to check whether the predetermined region has technical means for performing the at least one procedure, in particular for performing an autonomous driving operation. In some embodiments, the server device checks an identity of the motor vehicle when the possibility criterion is checked. For example, when the identity is checked, the server device can query an identification feature, such as a license plate number of the motor vehicle and/or a motor vehicle identifier, from the motor vehicle. Additionally or alternatively, the server device can check as a possibility criterion whether the at least one procedure in the predetermined region is possible, in particular at the current point in time. If, for example, a parking operation is requested as the predetermined procedure and all parking spaces are occupied, the predetermined procedure cannot be performed at all.

In some embodiments, when the request message is output, the server device transmits data of the motor vehicle, in particular an identification feature and/or an authentication feature and/or the data of the predetermined region captured by the capturing device of the motor vehicle, to the further server device. The identification number of the motor vehicle, for example, can be transmitted to the further server device as an identification feature. An identifier of the motor vehicle, in particular for establishing a connection, in particular a radio link, to the motor vehicle can be transmitted to the further server device as an authentication feature.

In order to check the authentication criterion, the further server device advantageously compares the data provided by the server device, which includes an identification feature and/or an authentication feature and/or the data of the predetermined region captured by the capturing device of the motor vehicle, to the data stored in the further server device and/or the data captured by a capturing device of the predetermined region for identification of the motor vehicle. For example, the further server device can check a license plate number of the motor vehicle as an authentication criterion, in that the capturing device of the predetermined region captures the license plate number of the motor vehicle and transmits it to the further server device. In addition, the license plate number of the motor vehicle is transmitted by the server device to the further server device as an identification feature. If the license plate number of the motor vehicle matches the license plate number captured by the capturing device of the predetermined region, the authentication criterion is met. In some embodiments, the server device transmits a local feature of the predetermined region captured by the capturing device of the motor vehicle to the server device. For this purpose, features of the predetermined region can be stored in the further server device. If the local feature captured by the capturing device of the motor vehicle matches a feature stored in the server device, the authentication criterion can be met. In some embodiments, the further server device can detect that the motor vehicle wants to establish a connection to the further server device, in particular a radio link to the further server device. If it is confirmed by the server device, for example by the request message, that the motor vehicle wants to establish a connection to the further server device or is trying to establish it, the authentication criterion can be met.

In some embodiments, for authentication of the motor vehicle, release data are output to the motor vehicle by the further server device, in particular via the server device. In other words, as soon as the authentication criterion is met, the server device can output release data to the motor vehicle. To this end, the server device can, for example, output at least one identification feature and/or at least one authentication feature to the motor vehicle. In some embodiments, a connection between the motor vehicle and the further server device for performing the at least one procedure of the motor vehicle by way of the further server device is released by the release data. In other words, this can result in a release for establishing a connection or for connecting the motor vehicle and the further server device, in particular via a communication link. After receiving the release data counterpart—that is, the motor vehicle and the further server device—the motor vehicle and the further server device are technically able to use the connection, in particular the local communication channel.

In addition, before the release data is output, the further server device checks whether the at least one procedure can be performed by the motor vehicle in the predetermined region. In other words, the further server device can output a communication authorization for the motor vehicle, in particular if the authentication criterion is met. After checking the availability of this service—performing the at least one procedure—and the suitability and permission of the motor vehicle and/or the server device, the further server device reports the availability of the service to the server device. In addition, the release data—in particular identification and authentication features of the further server device, in particular of the local communication unit of the further server device—can then be communicated to the server device for forwarding to the motor vehicle. In particular, this enables the data communication between motor vehicle and local infrastructure to be mutually released via the local radio link.

When the motor vehicle is successfully authenticated, a release message for coordinating the at least one procedure of the motor vehicle is advantageously output by the server device to the further server device. In other words, the server device can give the further server device a coordination authorization of the motor vehicle. In other words, the server device can then give the further server device the authorization to coordinate the at least one procedure or the driving operations of the motor vehicle.

In some embodiments, the release message is used to output a release code to the further server device. For this purpose, a token of the further server device can be stored, in particular temporarily or on a time-limited basis, as a release code, for example. In some embodiments, the further server device is coupled to a communication unit of the predetermined region, the communication unit being configured to coordinate the at least one procedure of the motor vehicle. In some embodiments, the token is stored in the local communication unit of the infrastructure or the predetermined region. In other words, a token for the at least one procedure or the coordination of the at least one procedure can be stored in the local infrastructure.

In some embodiments, if the motor vehicle is successfully authenticated by the server device, a further release message is output in order to perform the procedure coordinated by the further server device. In other words, the server device can use the further release message to output or grant the motor vehicle authorization to perform the coordination of the at least one procedure requested by the further server device. In other words, the server device can grant the motor vehicle a coordination authorization. The further release message can also be output in the form of a token, for example. In addition, the server device can store a token for this purpose in the motor vehicle. On this basis, any number of driving operations can be iteratively requested by the further server device and performed by the motor vehicle via the local communication channel—that is, the connection between the motor vehicle and the further server device.

The authentication of the motor vehicle is advantageously canceled as soon as the motor vehicle moves away from the predetermined region and/or a manual driving operation of the motor vehicle is captured. When the driver leaves the predetermined region and/or the vehicle is taken over, the token for storing the communication authorization is destroyed in the motor vehicle, for example, and a message is transmitted to the server device for withdrawal of the authorization and traceable logoff from the further server device. This immediately ensures that further coordination requests via the further server device, in particular the local communication channel, are rejected, even if the message to the server device is lost. The server device then also withdraws the coordination authorization from the further server device. Additionally or alternatively, the validity of the local communication channel, that is, the connection between the motor vehicle and the further server device, can be withdrawn by one or both sides destroying the token of the communication authorization.

As a result, unauthorized access to the communication channel as a connection to the further server device is no longer possible.

The disclosure also includes the combinations of the described embodiments.

The present disclosure also relates to a system for authenticating a motor vehicle in order to perform at least one procedure by way of the motor vehicle. The system can also include a plurality of motor vehicles. Correspondingly, a plurality of motor vehicles can also be authenticated by the system. The system comprises a predetermined region, wherein the at least one procedure of the motor vehicle relates to the predetermined region able to be traveled through by the motor vehicle. The motor vehicle is configured to approach the predetermined region in order to perform the at least one procedure within the predetermined region. A capturing device of the motor vehicle is configured to capture the predetermined region and thereby identify it. Furthermore, the motor vehicle is configured to output an identification message of the captured predetermined region to a server device of the system. The server device is configured to output a request message for authentication of the motor vehicle in response to the identification message to a further server device of the system associated with the predetermined region. The further server device is configured to receive the request message and to check an authentication criterion when the request message is received, wherein, when the at least one authentication criterion is met, the further server device authenticates the motor vehicle in order to perform the at least one procedure.

The disclosure also includes refinements of the method according to the disclosure, which have features such as those that were previously described in connection with the refinements of the motor vehicle according to the disclosure. For this reason, the corresponding refinements of the method according to the disclosure are not described herein again.

Figure 1:
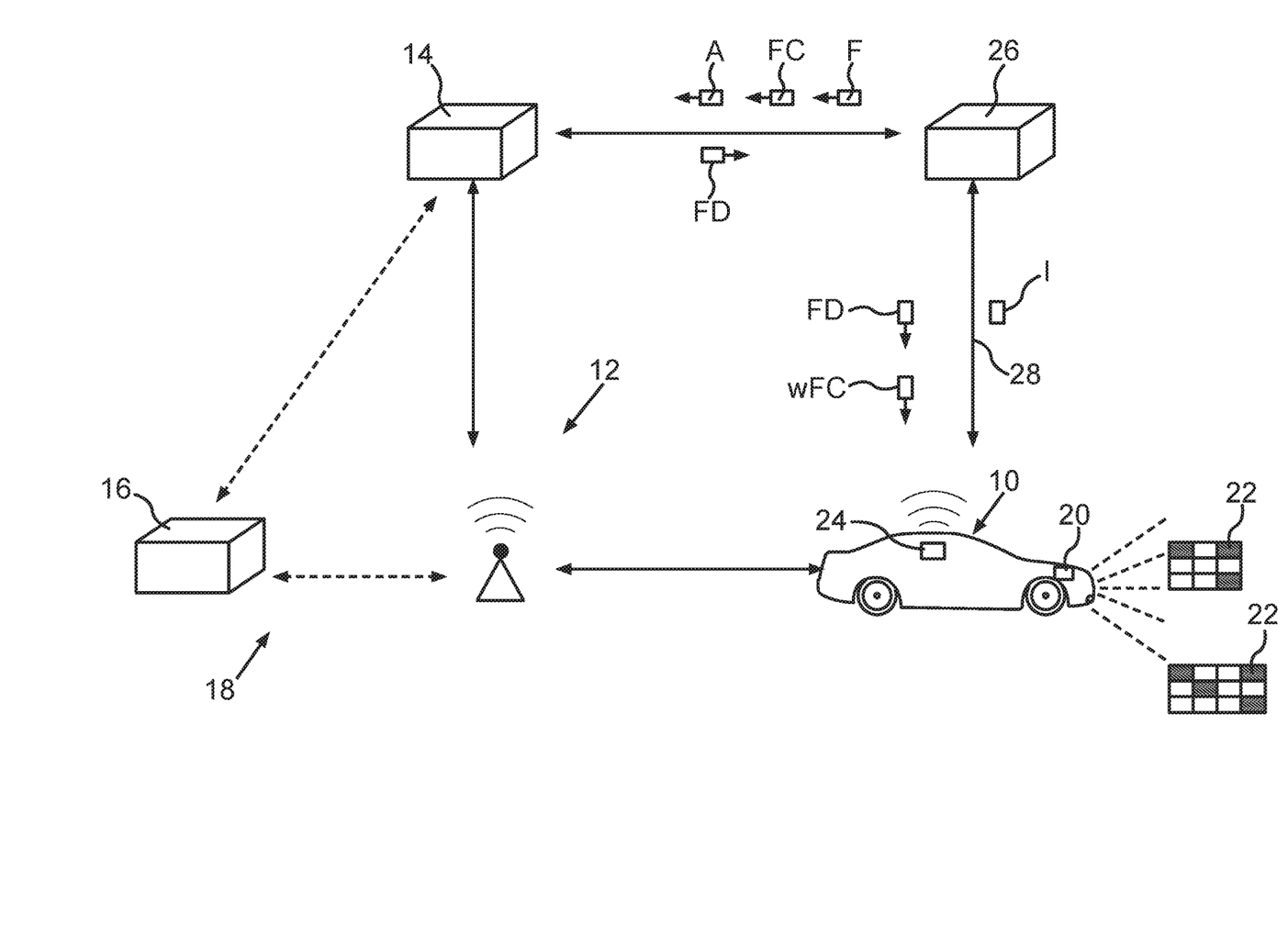
FIG. 1 shows a schematic representation of a method for authenticating a motor vehicle, according to some embodiments of the present disclosure.

In the following an exemplary embodiment of the disclosure is described. FIG. 1 shows a schematic representation of a method for authenticating a motor vehicle 10. The motor vehicle 10 is preferably a motor vehicle, in particular a passenger car.

The exemplary embodiments explained below are preferred embodiments of the disclosure. In the exemplary embodiments, the components of the embodiments that are described each constitute individual features of the disclosure to be considered independently of one another, which individually also further develop the disclosure independently of one another and are thus also to be considered part of the disclosure both individually and in a combination that is different from the combination described. In addition, the embodiments described may also be supplemented by further features of the disclosure which have already been described.

In the exemplary embodiment, the motor vehicle 10 approaches a parking garage (not shown in the FIGURE) as the predetermined region. In the parking garage, the motor vehicle 10 performs a driving operation as the at least one procedure. The motor vehicle 10 can also perform a plurality of driving operations in the parking garage. In some embodiments, the driving operation is performed autonomously or automatically by the motor vehicle 10. In order for the motor vehicle 10 to be able to automatically perform the driving operation, for example to drive to a parking position, the motor vehicle 10 communicates via a radio link 12 with a further server device 14 (also referred to as a second server device), which is associated with the parking garage, and/or with a server 16 of the parking garage, that is, a communication network of the parking garage, via the further server device 14. If the motor vehicle 10 communicates with the server 16, the motor vehicle 10 can communicate with the server 16 via a further radio link 18.

In order to avoid misuse of the communication between the motor vehicle 10 and the further server device 14 and/or the server 16, the radio link 12 or the further radio link 18 is only released after an authentication criterion has been met.

In order to obtain this authentication criterion, a plurality of successive steps or processes are necessary, which will be discussed in more detail below.

First, the motor vehicle 10 approaches the parking garage. A capturing device 20 of the motor vehicle 10 captures the parking garage. When the parking garage is detected, the capturing device 20 can, for example, capture a local feature 22 or a plurality of features 22 of the parking garage. For this purpose, the capturing device 20 comprises one or more sensors. In other words, the motor vehicle 10 can have an onboard sensor system for capturing the local feature 22. Additionally or alternatively, the capturing device 20 is configured to capture the radio link 12 when the parking garage is captured. In order to establish the radio link 12 with the further server device 14 or the further radio link 18 with the server 16 of the parking garage, the motor vehicle 10 has a communication device 24. For example, the communication device 24 is configured to establish a WLAN connection or an Long Term Evolution-Vehicle (LTE-V) connection as the radio link 12. As the further radio link 18, the communication device 24 can establish an Internet connection, such as a Digital Subscriber Line (DSL) connection, or a WLAN connection or a mobile radio link, to the server 16.

When the feature of the parking garage is captured, the capturing device 20 can, for example, capture a landmark of the parking garage. "Landmark" means in particular a visible, topographical object. For example, the capturing device 20 can capture a barrier of the parking garage or a street address of the parking garage or a street in which the parking garage is located as a landmark. When the radio link 12 is captured, the capturing device can capture a name of the radio link 12, for example.

The parking garage can be identified by capturing the parking garage, for example by capturing the at least one local feature and/or the radio link 12. The identification can be performed, for example, by a control device (not shown in the FIGURE) of motor vehicle 10. By capturing and identifying the parking garage, the control device of the motor vehicle 10 can assign this information to a digital map of the parking garage, in particular a geographical or location-specific map. For this purpose, the digital map can be stored in the control device or in a memory of the motor vehicle 10. In order to receive map information, in particular highly precise map information, of the digital map of the parking garage, the control device can also be configured to query or reload detailed information about the parking garage, for example from a server device 26 (also referred to as the first server device), in particular a server device of the manufacturer of the motor vehicle 10.

As can be seen from the FIGURE, the motor vehicle 10 is connected or coupled to the server device 26 via a further connection 28, in particular via a further radio link. For example, the motor vehicle 10 can be coupled or connected to the server device 26 via a mobile radio link. The mobile radio link can be designed in particular as a GPRS connection or LTE connection. The further connection 28 can be established by the communication device 24 of the motor vehicle 10.

As soon as the motor vehicle 10 has identified the digital map, an identification message I is output to the server device 26 via the further radio link 28, in particular by the communication device 24. The identification message I can include the digital map and/or the feature 22 of the parking garage captured by the capturing device 20 and/or the captured radio link 12, such as the name of the radio link.

The server device 26, which is associated in particular with the manufacturer of the motor vehicle 10, then determines the identity of the motor vehicle 10. For this purpose, the server device 26 can, for example, capture a license plate number of the motor vehicle 10 and/or an identifier of the motor vehicle 10. In addition, the motor vehicle 10 uses the identification message I to notify the server device 26 of a request to perform the at least one procedure for which the motor vehicle 10 is to be authenticated. The server device 26 then transmits to the further server device 14 a request message A in order to perform the at least one procedure of the motor vehicle 10.

The server device 26 is also configured to check a possibility criterion in response to the request of the motor vehicle 10. Here, the server device 26 checks suitability and/or permission for the requested procedure. When the possibility criterion is checked, the server device 26 checks, for example, whether the motor vehicle 10 is suitable for performing the at least one procedure in the parking garage and/or has access authorization to the parking garage at all. "Suitability" in particular means checking whether the parking garage has technical means in order to perform the at least one procedure, in particular for performing an autonomous driving operation. If, for example, a parking operation is requested as the predetermined procedure and all parking spaces are occupied, the predetermined procedure cannot be performed at all. The identity of the motor vehicle 10 and/or the suitability of the motor vehicle 10 and/or the authorization of the motor vehicle 10 is therefore checked on the vehicle side. This forms in particular a basis for a communication authorization of the motor vehicle 10 with the further server device 14.

When the request message A is output, the server device 26 transmits data of the motor vehicle 10, in particular an identification feature and/or authentication feature and/or the data of the parking garage captured by the capturing device 20 of the motor vehicle 10, to the further server device 14. The license plate number of the motor vehicle 10 can be transmitted to the further server device 14 as an identification feature. As an authentication feature, an identifier of the motor vehicle 10, for example, in particular for establishing a connection, in particular a radio link, such as a WLAN connection, to the motor vehicle 10 can be transmitted to the further server device. For example, a Personal Identification Number (PIN) or a key can be transmitted as the identifier.

The further server device 14 then checks the authentication criterion. In this case, the further server device 14 compares the data provided by the server device 26, which include an identification feature and/or an authentication feature and/or the parking garage data captured by the capturing device 20 of the motor vehicle 10, to the data stored in the further server device 14 and/or to the data of the further server device 14 that are captured by a capturing device (not shown in the FIGURE) of the parking garage for the identification of motor vehicle 10. For example, the further server device 14 can check the license plate number of the motor vehicle 10 as an authentication criterion, by capturing the license plate number of the motor vehicle 10 by way of a capturing device in the parking garage and transmitting it to the further server device 14. In addition, the license plate number of the motor vehicle 10 is transmitted by the server device 26 to the further server device 14 as an identification feature. If the license plate numbers match, the authentication criterion can be met. In some embodiments, the server device 26 transmits a local feature of the parking garage captured by the capturing device 20 of the motor vehicle 10 to the server device 26. Features of the parking garage can be stored for this purpose in the further server device 14. If the local feature captured by the capturing device 20 of the motor vehicle 10 matches one of the features stored in the further server device 14, the authentication criterion can be met. Other matching criteria, which relate, for example, to the radio link 12 or the parking garage, are also possible for checking the authentication criterion.

If the authentication criterion is met, the further server device 14 outputs release data FD to the motor vehicle 10 via the server device 26. In addition, the further server device 14 can output feedback on the availability for performing the at least one procedure for the motor vehicle 10. The release data FD and/or the feedback on the availability serve in particular on the infrastructure side, that is, on the infrastructure side or on the part of the parking garage, as the basis for a communication authorization.

The release data FD can be used by the further server device 14, for example, to output at least one identification feature and/or at least one authentication feature of the radio link 12, such as an identifier or a key, to the motor vehicle 10. The release data FD may also be time-limited.

As soon as the motor vehicle 10 has received the release data FD, a mutual release of the data communication between the motor vehicle 10 and the further server device or the server 16 is obtained via the radio link 12 or the further radio link 18.

If the motor vehicle 10 is successfully authenticated, the server device 26 outputs a release message F for coordinating the at least one procedure of the motor vehicle 10 to the further server device 14. The release message F gives the further server device 14 the authorization to coordinate the at least one procedure or the driving operations of the motor vehicle 10.

With the release message F, a release code FC is output to the further server device 14. For this purpose, a token of the further server device 14 can be stored, in particular temporarily or on a time-limited basis, as release code FC, for example. In some embodiments, the motor vehicle 10 is coordinated by the server 16. In some embodiments, the token is stored in the server 16, that is, it is stored in the local communication unit of the parking garage.

When the motor vehicle 10 is successfully authenticated, the server device 26 also outputs a further release code wFC for executing the procedure coordinated by the further server device 14. The further release code wFC may also be output in the form of a token. In addition, the server device 26 can store the further release code wFC, that is, the token, in the motor vehicle 10. In addition, the server device 26 outputs further release codes wFCs, in particular in each case in the form of tokens, for each driving operation of the motor vehicle to be coordinated by the further server device.

On this basis, any number of driving operations can be iteratively requested by the further server device 14 or the server 16 via the local communication channel—that is, the radio link 12 between the motor vehicle 10 and the further server device 14 or the further radio link 18 between the motor vehicle 10 and the server 16—and be performed by the motor vehicle 10.

The authentication of the motor vehicle 10 is canceled as soon as the motor vehicle 10 moves away from the parking garage and/or a manual driving operation of the motor vehicle 10 is captured. The token or the further release code wFC in the motor vehicle 10 is then deleted. The motor vehicle 10 then outputs a message to the server device 26, whereupon the server device 26 outputs a message to the further server device 14.

Overall, the examples show how the disclosure provides a method for authenticating automated vehicles in an active infrastructure.

According to a particularly preferred exemplary embodiment, the method involves a secure sequence for registering the motor vehicle or vehicle in an admissible infrastructure, in particular the parking garage. Using the vehicle sensors, a digital a-priori map, a local radio link and the communication with a server device, in particular a backend server on the manufacturer side, and a further server device, in particular a backend server on the service operator side, establishes the mutual identification and authentication between vehicle and infrastructure and a secure, clear communication between the parties involved. For the time of administration by the system of the infrastructure operator, there is an authorization assignment for the request for automated driving operations by the infrastructure that is withdrawn after the driver takes over again for manual driving.

The vehicle that wants to perform automatic driving operations within an infrastructure equipped for this purpose with a suitable communication unit for a local connection, such as WLAN or LTE-V, a communication unit for a mobile radio link, such as GPRS or LTE, and a sensor system to capture its environment. The vehicle manufacturer's backend can be reached via the mobile phone connection, where services for processing protocols with the vehicle are available.

The infrastructure provided for automatic driving operations also contains a communication unit for local connections and an Internet connection, such as DSL. Optionally, a configuration having a local server for coordinating automatic driving operations is possible. Via the Internet connection, a comprehensive backend of the infrastructure operator is reached on which infrastructure-specific services, such as reservation of parking spaces, payment or access rights are available.

In the vehicle and the infrastructure, a digital map of the infrastructure is available in which perceptible elements and metadata of the infrastructure are stored. Appropriate mechanisms ensure a consistent base of information on both sides.

The processes for registering the vehicle in the active infrastructure follow the following steps:

1) Driving into the active infrastructure
 a. discovery of the local radio channel by the vehicle
 b. capture of local features by the vehicle sensors As it approaches, the vehicle which wants to perform automatic driving operations in an infrastructure detects a local radio link and the surroundings of the vehicle, such as landmarks, as perceived by onboard sensors.

2) Establishing the relationship between detections, for example features and/or a radio channel, using information from the a priori map. Additionally or alternatively, detailed maps can be requested and reloaded.

By comparing the detected information, such as a name of the radio link or identified landmarks, to the digital map, the target infrastructure is identified on the vehicle side. In an advantageous form, this information is used to reload further detailed information on the corresponding infrastructure in a data-efficient manner.

3) Reporting of the identification of the active infrastructure by the vehicle to the manufacturer back-end. In particular, the vehicle transmits the target infrastructure data to the manufacturer backend via the mobile radio interface.

4) Checking the identity of the vehicle and requesting the service parameters and registration from the manufacturer backend to the operator backend, in particular on the infrastructure side. This message forms in particular a basis for a communication authorization, in particular on the vehicle side. After ensuring the identity of the requesting vehicle, as well as suitability and permission for the requested automated movement by a suitable service, the manufacturer backend queries the availability of the infrastructure from the operator backend. Identification and authentication features of the local communication unit of the vehicle are transmitted.

5) Checking and reporting back on the availability of service for the vehicle and obtaining a basis for communication authorization, in particular on the infrastructure side. After checking the availability of the service, as well as the suitability and permission of the vehicle and the manufacturer backend, the operator backend reports the availability of the service to the manufacturer backend. In addition, identification and authentication features of the local communication unit of the infrastructure are communicated to the manufacturer backend for forwarding to the vehicle.

6) Obtaining mutual release of data communication between vehicle and local infrastructure via the local radio link, that is, mutual or bidirectional communication authorization. After receiving the identification and authentication features of the counterpart, the vehicle and infrastructure are technically able to use the local communication channel in a secure manner, in particular through the communication authorization.

7) Granting of the coordination authorization to the operator, in particular the exchange between backend servers, and storage of tokens in the local infrastructure. The manufacturer backend then gives the operator backend the authorization to coordinate the driving operations of the vehicle. For this purpose, a temporarily limited token can usefully be stored in the operator backend and then in the local communication unit of the infrastructure.

8) Granting of coordination authorization to the vehicle and storage of tokens in the vehicle. The manufacturer backend also grants the vehicle the authorization, in the form of a token, to execute movements requested from the local infrastructure. In an advantageous embodiment, for movements of the vehicle, for example a trip from one location to another location, that is, A to B, a renewed request for authorization from the manufacturer back-end to ensure traceability and manufacturer monitoring is requested or a token having a very limited validity is used.

9) Iterative request and execution of driving maneuvers and/or approval of individual driving operations. On this basis, any number of driving operations can be iteratively requested by the infrastructure via the local communication channel and performed by the vehicle.

10) Withdrawal of the coordination/communication authorization after the driver (in the vehicle) takes over the vehicle
   a. delete tokens in the vehicle
   b. message from vehicle to manufacturer backend
   c. message from manufacturer backend to operator backend When the infrastructure is left and the vehicle is taken over by a driver or a further automated driving function, the token for storing the coordination authorization is destroyed locally in the vehicle and a message is sent to the manufacturer backend to withdraw the authorization and traceable logoff from the infrastructure. This ensures that further coordination requests are immediately rejected via the local communication channel, even if the message to the manufacturer backend is lost. The manufacturer backend then also withdraws the coordination authorization in the operator backend.

In addition, the validity of the local communication channel can be withdrawn by destroying the token for communication authorization on one or both sides (see step 6). This means that further unauthorized access to the communication channel is not possible.

By designing the registration process as a multi-stage process in which an independent information base on the individual sides of vehicle and/or manufacturer and operator and/or local infrastructure is continuously expanded, a secure process for mutual authentication can be presented.

The use of recognizable local elements that can be captured locally by the vehicle enables a verifiable local relationship between the vehicle and the infrastructure.

The integration of the manufacturer backend into the communication chain ensures central control and traceability of the coordination releases for vehicles. The latency and efficiency advantages of a local connection can still be exploited.

The secure basis for the coordination of the vehicle through an external infrastructure can not only be given clearly and traceably, but also withdrawn.

The invention claimed is:

1. A method for authenticating a motor vehicle, comprising:
   approaching of the motor vehicle to a predetermined region to perform a procedure within the predetermined region, wherein the predetermined region is able to be traveled through by the motor vehicle;
   capturing the predetermined region by a capturing device of the motor vehicle to identify the predetermined region;
   outputting, from a communication device of the motor vehicle, an identification message of the captured predetermined region to a first server;
   outputting, from the first server, a request message for authenticating the motor vehicle, in response to the identification message, to a second server associated with the predetermined region;
   checking, by the second server, an authentication criterion when the request message is received;
   authenticating the motor vehicle to perform the procedure when the authentication criterion is met;
   outputting, by the second server, release data to the motor vehicle via the first server; and
   releasing, by the second server the release data, for an establishment of a connection between the motor vehicle and the second server to perform the procedure of the motor vehicle based on the release data.

2. The method according to claim 1, wherein the capturing of the predetermined region comprises at least one of capturing a feature of the predetermined region by the capturing device or capturing a radio link to the second server.

3. The method according to claim 2, further comprising:
   when the predetermined region is identified, associating a digital map of the predetermined region with the predetermined region on the basis of the captured feature and/or the captured radio link.

4. The method according to claim 3, wherein the outputting of the identification message comprises outputting map data of the digital map and/or the feature of the predetermined region.

5. The method according to claim 1, further comprising:
   before the outputting of the request message, checking, by the first server, a possibility criterion to perform the procedure by the motor vehicle.

6. The method according to claim 5, further comprising:
   after checking the possibility criterion, checking, by the first server, whether the motor vehicle is suitable to perform the procedure within the predetermined region and/or has an access authorization to the predetermined region.

7. The method according to claim 1, wherein the checking of the authentication criterion comprises comparing, by the second server, data provided by the first server to data of the predetermined region, wherein
   the data provided by the first server comprise motor vehicle identification data and/or the data of the predetermined region captured by the capturing device of the motor vehicle; and
   data of the predetermined region are stored by the second server and/or captured by another capturing device of the predetermined region for identification of the motor vehicle.

8. The method according to claim 7, wherein the checking of the authentication criterion further comprises meeting the authentication criterion if the data provided by the first server match the data of the predetermined region.

9. The method according to claim 1, further comprising:
   upon successful authentication of the motor vehicle, outputting, by the first server, a release message to the second server for coordinating the procedure of the motor vehicle.

10. The method according to claim 9, wherein the outputting of the release message comprises outputting, by the first server, a release code to the second server.

11. The method according to claim 10, further comprising:

outputting, by the first server, a further release code to the motor vehicle to perform the procedure coordinated by the second server.

12. The method according to claim 1, further comprising:
cancelling the authentication of the motor vehicle when the motor vehicle moves away from the predetermined region or when a manual driving operation of the motor vehicle is detected.

\* \* \* \* \*